C. McGOWAN.
Plank-Roadways.
No. 146,931.
Patented Jan. 27, 1874.
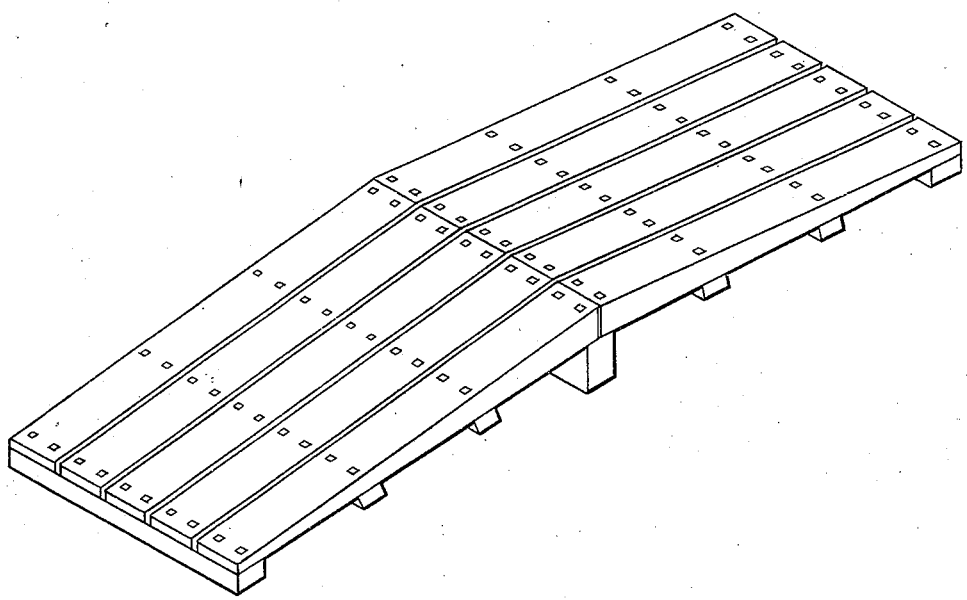
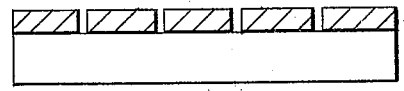
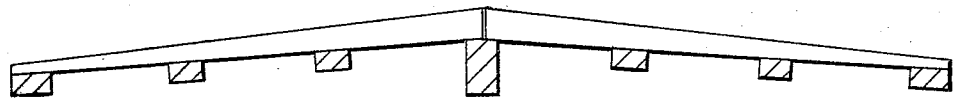
Witnesses
John L. Borre
C. Milton Richardson
Cornelius McGowan
by Dewey & Co
attys

UNITED STATES PATENT OFFICE.

CORNELIUS McGOWAN, OF SAN FRANCISCO, CALIFORNIA.

IMPROVEMENT IN PLANK ROADWAYS.

Specification forming part of Letters Patent No. 146,931, dated January 27, 1874; application filed December 22, 1873.

*To all whom it may concern:*

Be it known that I, CORNELIUS MCGOWAN, of San Francisco city and county, State of California, have invented Improvements in Planking Streets; and I do hereby declare the following description and accompanying drawings are sufficient to enable any person skilled in the art or science to which it most nearly appertains to make and use my said invention or improvement without further invention or experiment.

In planking streets it has heretofore been usual to employ boards or planks of a uniform thickness; and, as the greatest amount of travel and wear occurs at or near the middle of the street, the planks along that part of the street soon become worn through, while along near the curb they are but little worn.

My improvement consists in sawing the boards or planks which are to be used for street-planking thicker at one end than at the other, and placing them with the thickest part at the middle of the street, while the thinner portion comes next to the sidewalk, where the travel is less.

The accompanying drawing represents a section of a street covered with my improved planks.

Instead of sawing the planks with a uniform thickness of four inches, for instance—the usual thickness of street-planks—I will gage them to a thickness of two inches at one end, and six inches at the opposite end, thus giving a plank of gradually-increasing thickness toward the middle of the street, and without using any more lumber than would have been used had the planks been sawed with a uniform thickness of four inches.

The trouble and expense of sawing boards or planks in this manner will be no greater than that of sawing them of a uniform thickness, as the log can be alternately pitched in one direction and then in the other as each cut is made, thus at once sawing the planks in the usual way.

The expense of the spikes required to secure my tapering street-planks will be no greater than that required in nailing down planks of uniform thickness, for the reason that a shorter spike can be used at the thin portions of the plank, to compensate for the longer ones required at the thicker portion.

By this means I obtain great economy in the planking of streets, as the greatest thickness of wearing material is placed at the greatest wearing-point, causing the pavement or planking to last a much greater length of time than it otherwise would.

This plan of economizing lumber can be applied upon all traveled ways, such as bridges, floors, sidewalks, and like places, where the travel is mostly in one line, and it can be applied to any thickness of boards or planks.

Having thus described my invention, what I claim, and desire to secure by Letters Patent, is—

The improvement in plank streets above described, the same consisting in the employment of double rows of wedge-shaped planks laid transversely, and having their thicker ends abutting together in the center of the roadway, thereby forming the crown of the street, substantially as set forth.

In witness whereof I hereunto set my hand and seal.

CORNELIUS McGOWAN. [L. S.]

Witnesses:
JOHN L. BOONE,
C. MILTON RICHARDSON.